May 29, 1956 — W. C. SMITH — 2,747,917
MELON CARRIER
Filed Aug. 11, 1953

INVENTOR
Willard C. Smith
BY Gustave Miller
ATTORNEY

United States Patent Office 2,747,917
Patented May 29, 1956

2,747,917
MELON CARRIER

Willard C. Smith, Dade City, Fla.

Application August 11, 1953, Serial No. 373,469

2 Claims. (Cl. 294—116)

The present invention relates generally to hand tools and specifically to a pair of tongs for picking and carrying melons.

Present devices for transporting semi-fragile farm produce such as water melons, cantaloups, etc., include canvas slings, crates and the like. The invention herein described is an improvement over the devices now used, and has for its principal object to provide a hand tool which can lift and securely hold a melon of comparatively large size without bruising or injuring the skin thereof, for as is well known, skin blemishes detract from the value of such farm produce and offer entrance to harmful bacteria which destroy the melon.

Another object of the invention is to provide such a tong or carrier that can be operated easily with one hand and can be lifted easily loaded with a melon to another level, a truck buoy for instance, and the same handle grasped by another person without shifting of either the handle or the melon within the carrier.

A still further object is to provide such a carrier with a large bearing surface so that a large area of surface contacts the melon, thereby reducing the risk of abrading or bruising the skin of the melon.

Another object is to provide a melon carrier which requires no springs or other pressure on its handles to maintain its grip on the melon, and one which can encompass melons of large or small sizes with virtually the same gripping power.

These and other objects of the invention will be more fully understood upon consideration of the annexed drawings and following description, in which like numerals indicate like parts throughout the several views, and in which—

Figure 1:
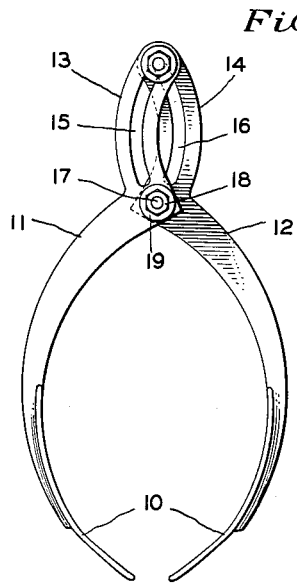
Fig. 1 is an end view in elevation of the invention.
Figure 2:
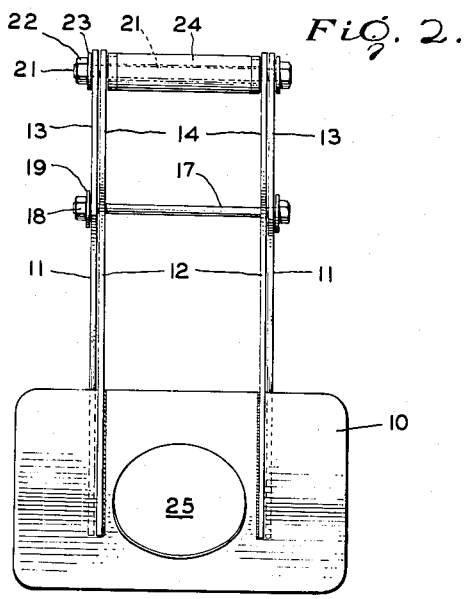
Fig. 2 is a side view in elevation.
Figure 3:
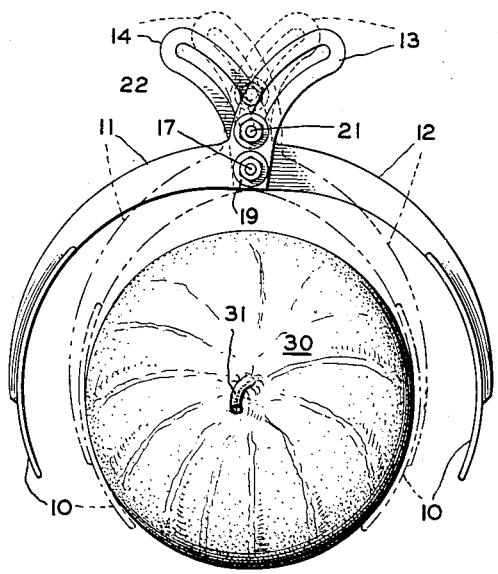
Fig. 3 is an end view in elevation of the carrier in open position showing in dotted lines the closed position holding a melon.

Referring to the drawings, in Figs. 1 to 3 it will be seen that two curved plates 10 are each welded or otherwise secured to two pair of arcuate arms 11 and 12 which have cam extensions 13 and 14 at their upper ends. In each of the extensions 13 and 14 are cut sliding slots or cam slots 15 and 16. A pivot pin or bolt 17 and nut 18 spaces each of the pair of arms 11 and 12 from each other and is itself made friction-free by washers 19. Loosely slidable in the cam slots 15 and 16 of each pair of extensions 13 and 14 is a second bolt 21 having a nut 22 at the end thereof and washers 23 to eliminate binding. A cylindrical handle 24 is loosely pinioned on the bolt 21 and freely rotates thereon to provide a finger-free and comfortable grip of the carrier.

In Fig. 2, one of the curved plates 10 is shown to have a hole 25 which not only reduces the weight of the tool but also, being in the center of each plate may permit better gripping of the melon at its slightly lesser diameters each way from the melons middle.

In Fig. 3, it will be seen that the handle 24 and pivot bolt 17 are squeezed in gripping fashion to open the carrier, then in dotted lines, as the fingers release the pivot bolt 17 and lift on the handle 24, movement of the second bolt ends in the sliding or cam slots 15 and 16 of each pair of arm extensions causes the pair of plates 10 to approach each other around the melon, here indicated at 30.

Figure 4:
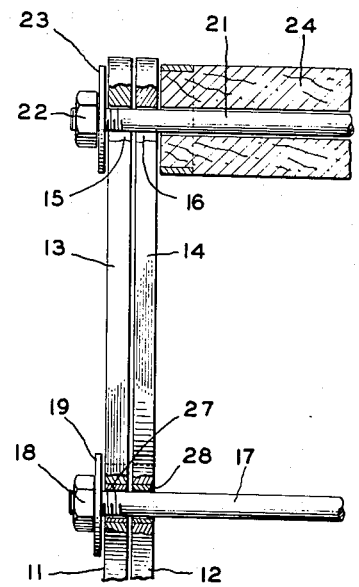
Fig. 4 is a partial view of the handle mechanism, partially in section.

In Fig. 4, a pair of bronze bushings 27 and 28 are inserted over the pivot bolt 17 at each end where it traverses holes 29 in each of the pair of arms 11 and 12 to prevent wear at this point.

Operation of the melon carrier is fully apparent as set forth above. One hand operation is obvious, the pivot bolt 17 and handle 24 are within finger reach, the carrier can be opened over a melon and closed over the melon by releasing the fingers from the bolt 17 and shifting the full grip to the handle 24, thusly closing the carrier snugly around the melon. Usually, in most melon production, the vine can be snapped from the melon end, here shown as 31, without destroying the vine. This allows the picker to use two of these melon carriers, one in each hand, and by making handle 24 of sufficient length, it is not only possible but becomes convenient to lift each carrier and melon to a person on a truck who can grasp the handle without the carrier shifting or releasing its hold on the melon.

It will be seen, therefore, that this invention will be an improvement over present devices, and although especially applicable to the picking and handling of melons, is not to be construed as limited to such produce or articles, nor is the specific construction herein described and illustrated to be construed as the only embodiment of the invention. Other embodiments and construction may be contemplated for the invention as set forth in the following claims.

Having thus set forth and disclosed the nature of this invention, what is claimed is:

1. In an apparatus of the character described, an article carrier comprising a pair of smooth surface inwardly concaved arcuate plates movable toward each other to form a substantially cylindrical grip, at least one pair of upwardly extending support arms secured one to each plate, means pivotally securing each of said pairs of arms to each other, upwardly extending second arms on each of said pairs of arms extending at an obtuse thereto, and handle means movable on said upwardly extending second arms operable to move each of said support arms and said arcuate plates toward each other around an article to be carried.

2. In a carrier for farm produce or the like which have substantially cylindrical shapes, the improvement of a pair of curved plates substantially rectangular in shape but having an arcuate inwardly concaved smooth cross sectional surface, a pair of support arms fixed to and extending upwardly of each plate, an extension arm on the upper end of each support arm, an arcuate cam slot cut in each extension arm, means pivotally securing each pair of support arms to its opposite pair, and handle means movable in said cam slots operable to move said pairs of support arms to closely adjacent position and hence said curved plates inwardly relative to each other to grasp the produce.

References Cited in the file of this patent
UNITED STATES PATENTS 2,185,561     Nenstiel _____ Jan. 2, 1940

FOREIGN PATENTS 71,134     Norway _____ Aug. 11, 1947